United States Patent
Basso et al.

(10) Patent No.: US 8,250,148 B2
(45) Date of Patent: *Aug. 21, 2012

(54) REDUCING MEMORY ACCESSES IN PROCESSING TCP/IP PACKETS

(75) Inventors: Claude Basso, Raleigh, NC (US);
Philippe Damon, Raleigh, NC (US);
Laurent Frelechoux, Lausanne (CH);
Brahmanand K. Gorti, Cary, NC (US);
Bernard Metzler, Zurich (CH); Bay V. Nguygen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

This patent is subject to a terminal disclaimer.

(21) Appl. No.: 12/185,101

(22) Filed: Aug. 3, 2008

(65) Prior Publication Data

US 2008/0307439 A1   Dec. 11, 2008

Related U.S. Application Data

(63) Continuation of application No. 10/706,235, filed on Nov. 12, 2003, now Pat. No. 7,436,853.

(51) Int. Cl.
G06F 15/16 (2006.01)

(52) U.S. Cl. ......... 709/205; 709/223; 709/224; 709/238

(58) Field of Classification Search .................. 709/250, 709/223, 224, 238, 205

See application file for complete search history.

(56) References Cited

U.S. PATENT DOCUMENTS

| | | | |
|---|---|---|---|
| 5,381,413 A | 1/1995 | Tobagi et al. | 370/85.6 |
| 6,014,717 A | 1/2000 | Bezzant et al. | 710/22 |
| 6,108,701 A | 8/2000 | Davies et al. | 709/224 |
| 6,273,622 B1 | 8/2001 | Ben-David | 395/200.6 |
| 6,327,626 B1 | 12/2001 | Schroeder et al. | 709/236 |
| 6,359,901 B1 | 3/2002 | Todd et al. | 370/465 |
| 6,456,603 B1 | 9/2002 | Ismailov et al. | 370/310 |
| 6,581,150 B1 | 6/2003 | Col et al. | 711/201 |
| 6,640,292 B1 | 10/2003 | Barth et al. | 711/168 |
| 6,993,637 B1 | 1/2006 | Kwong | 711/167 |
| 2003/0188112 A1 | 10/2003 | Saito et al. | 711/154 |

*Primary Examiner* — Lan-Dai T Truong
(74) *Attorney, Agent, or Firm* — Robert A. Voight, Jr.; Winstead, P.C.

(57) ABSTRACT

A method, computer program product and system for processing TCP/IP packets. A TCP protocol stack may store a payload of a received TCP/IP packet in a data fragment list. The TCP protocol stack may further read the header of the received packet to extract a value used to index into a table storing a list of transport control blocks (TCBs). The TCP protocol stack may further perform a lock and a read operation on the TCB indexed in the table. The TCP protocol stack may further transmit the payload to the TCP application without requiring the application to perform a lock, read, write or unlock operation on the indexed TCB since the TCP protocol stack and the TCP application are operating on the same thread. By the TCP application foregoing the lock, read, write and unlock operations on the TCB, there is a reduction in the number of memory accesses.

10 Claims, 3 Drawing Sheets

REDUCING MEMORY ACCESSES IN PROCESSING TCP/IP PACKETS

CROSS REFERENCE TO RELATED APPLICATIONS

The present application is a continuation application of pending U.S. patent application Ser. No. 10/706,235, which was filed on Nov. 12, 2003, which is assigned to the assignee of the present invention. The present application claims priority benefits to U.S. patent application Ser. No. 10/706,235.

TECHNICAL FIELD

The present invention relates to the field of communication data networks, and more particularly to reducing memory accesses (transport control block accesses) in processing TCP/IP packets.

BACKGROUND INFORMATION

A communications network may generally be defined as a collection of computers or computing systems which interact or transmit data between one network device, e.g., client, router, gateway, and another network device, e.g., server. For example, a communications network may comprise a host machine, e.g., server computer on the Internet commonly referred to as a web server, connected to one or more computers commonly referred to as clients via the Internet. The Internet may refer to a network of networks.

The Internet is based upon a suite of communication protocols known as the Transmission Control Protocol/Internet Protocol (TCP/IP) transmission protocol. A network that uses TCP/IP may be referred to as an Internet Protocol (IP) network. In TCP/IP, the standard describes how an Internet-connected computer should break data down into packets for transmission across the network, and how those packets should be addressed so that they arrive at their destination. IP is the connectionless part of the TCP/IP protocol. The TCP specifies how two Internet computers can establish a reliable data link by means of handshaking.

When one network device, e.g., client, attempts to establish a connection with another network device, e.g., server, using the TCP/IP protocol, the network devices exchange connection state information. For example, the state information may include the number of bytes sent/received on that connection. The state information may also include the number of bytes the network device is allowed to transmit prior to receiving an acknowledgment from the receiving network device. This state information may be stored in a data structure called a "transport control block (TCB)" in the receiving network's memory, e.g., random access memory. Each connection may be associated with a particular TCB and each network device may store a table in its memory that includes a listing of TCBs.

As stated above, information may be transmitted over the Internet using a TCP/IP protocol suite or what may be called a "TCP protocol stack." The TCP protocol stack may reside in the operating system of the network device. Upon the network device receiving a TCP/IP data packet from a transmitting network device to establish a connection, the TCP protocol stack in the receiving network device may search its memory for the TCB associated with that connection. The TCP/IP packet may include in its header a key, or a value stored in a series of bits, that is used by the TCP protocol stack in the receiving network to index or hash into a table in its memory storing TCBs. Upon finding an entry in the table storing TCBs, the TCP protocol stack in the receiving network device identifies a particular TCB in the indexed entry.

If a network device has multiple processes running in parallel (referred to as a multithreaded system), then other threads (processes) in the network device may be processing data packets for the same connection in parallel. If multiple processes access the same TCB, then a process may obtain invalid information. For example, if one process updates the TCB while another parallel process reads the information in that TCB for the same connection, then the parallel process may read invalid information. Consequently, in order to prevent information in the TCB being overwritten or discarded while another parallel process accesses that TCB, the TCP protocol stack "locks" the TCB indexed in the table. "Locking" refers to preventing another process from accessing that TCB.

Once the TCB is locked, the TCP protocol stack reads the TCB. For example, the TCP protocol stack may read the TCB, which contains the expected sequence number, to determine if the received TCP/IP packet was the packet expected to be received. The TCP protocol stack may determine if the received packet was the packet to be received by reading the sequence number in the packet header of the received packet. If the sequence number read in the header of the received packet is the expected sequence number, then the receiving network device received the expected packet. Otherwise, the receiving network device did not receive the expected packet and may re-sequence or wait for the missing packet.

Next, the TCP protocol stack writes to the TCB, such as updating the state information. For example, the TCP protocol stack may update the next sequence number to be received. Further, in the write operation, the TCP protocol stack may update a pointer in the TCB in order to point to the entry in a buffer, referred to as the "data fragment list," that contains the payload of the received packet. The TCP protocol stack deposits the payload of the received packet in the data fragment list upon receiving the packet.

Next, the TCP protocol stack unlocks the TCB thereby allowing another process to access the TCB. Hence, the TCP protocol stack performs the operations of lock, read, write and unlock.

Once these operations are performed, the TCP protocol stack transmits an acknowledgment to the transmitting network device that the TCP/IP packet had been received. The TCP protocol stack may further transmit a notification to an application ("TCP application") in the receiving network device to read the data in the payload of the received packet. Along with the notification may include an address of the TCB in order for the TCP application to directly access the TCB in the table.

The TCP application may then invoke a function call to the TCP protocol stack to read the payload in the received packet. In order to retrieve the data stored in the payload in the received packet, the TCP application must read the TCB associated with the connection in order to obtain the pointer to the data in the data fragment list.

The TCP application performs the same series of operations as the TCP protocol stack. Namely, the TCP application performs the lock, read, write and unlock operation on the same TCB. The TCP application performs the lock operation on the TCB for reasons stated above. The TCP application may then read the TCB to obtain the pointer to the data stored in the data fragment list. Upon reading the data, the TCP application may write or update the TCB. For example, the TCB may be updated to update the pointer to the data fragment list. Upon writing to the TCB, the TCP application unlocks the TCB.

In certain situations, the TCP protocol stack may transmit to the transmitting network device an indication as to changes in the data fragment list after the TCP application reads data from the list. For example, the TCP protocol stack may inform the transmitting network device that the data fragment list is no longer full and that the TCP protocol stack is able to receive new packets of data from the transmitting network device.

Upon the TCP application acquiring the data from the data fragment list, the TCP application may transmit the acquired data to the processor to be processed.

Using the process described above to process an incoming TCP/IP packet results in at least 8 operations or accesses (TCP protocol stack performs 4 operations and the TCP application performs 4 operations) to the memory storing the table of TCBs. If the number of memory accesses could be reduced, the latency involved in processing a TCP/IP packet would be reduced and hence the performance of the network device could be improved.

Therefore, there is a need in the art to reduce memory accesses (transport control block accesses) in processing TCP/IP packets.

SUMMARY

The problems outlined above may at least in part be solved in some embodiments by the TCP protocol stack transmitting the payload of the received TCP/IP packet to the TCP application instead of the TCP application being required to read the TCB (associated with the connection) in memory in order to obtain the pointer to the location in the data fragment list containing the payload to be read. The TCP protocol stack may directly transmit the payload since the TCP protocol stack and the TCP application are operating on the same thread. The TCP application and the TCP protocol stack are operating on the same thread as the TCP protocol stack continues to have the TCB locked during the transmission of the payload to the TCP application. By the TCP application foregoing the lock, read, write and unlock operations on the TCB, there is a reduction in the number of memory accesses thereby reducing the latency in processing TCP/IP packets.

In one embodiment of the present invention, a method for processing packets of data may comprise the step of receiving a packet of data. The method may further comprise storing a payload of the received packet of data in a buffer. The method may further comprise reading a header of the received packet to extract a value. The method may further comprise indexing in a table storing a list of transport control blocks using the value. The method may further comprise performing a lock operation and a read operation on a transport control block in an indexed entry in the table. The method may further comprise transmitting a notification to an application to read the payload where the notification comprises an address of the transport control block. The method may further comprise transmitting the payload of the received packet of data to the application whereby the application does not perform a lock, read, write or unlock operation on the transport control block.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for processing TCP/IP packets of data with fewer memory accesses. In one embodiment of the present invention, a TCP protocol stack stores a payload of a received TCP/IP packet of data in a data fragment list. The TCP protocol stack may further read the header of the received packet to extract a value used to index into a table storing a list of transport control blocks. The TCP protocol stack may further perform a lock operation and a read operation on the transport control block indexed in the table. The TCP protocol stack may further transmit an indication to a TCP application to read the payload of the received packet. The TCP protocol stack may further transmit the payload of the received TCP/IP packet to the TCP application without requiring the application to perform a lock, read, write or unlock operation on the indexed TCB. The TCP protocol stack may directly transmit the payload since the TCP protocol stack and the TCP application are operating on the same thread. The TCP application and the TCP protocol stack are operating on the same thread as the TCP protocol stack continues to have the indexed TCB locked during the transmission of the payload to the TCP application. By the TCP application foregoing the lock, read, write and unlock operations on the TCB, there is a reduction in the number of memory accesses thereby reducing the latency in processing TCP/IP packets.

Although the present invention is described with reference to the TCP/IP transmission protocol, it is noted that the principles of the present invention may be applied to any transmission protocol. It is further noted that embodiments applying the principles of the present invention to such transmission protocols would fall within the scope of the present invention.

It is further noted that although the present invention is described with reference to performing a TCP receive function that the principles of the present invention may be applied to the TCP transmit function. It is further noted that embodiments applying the principles of the present invention to the TCP transmit function would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figures 1, 3:
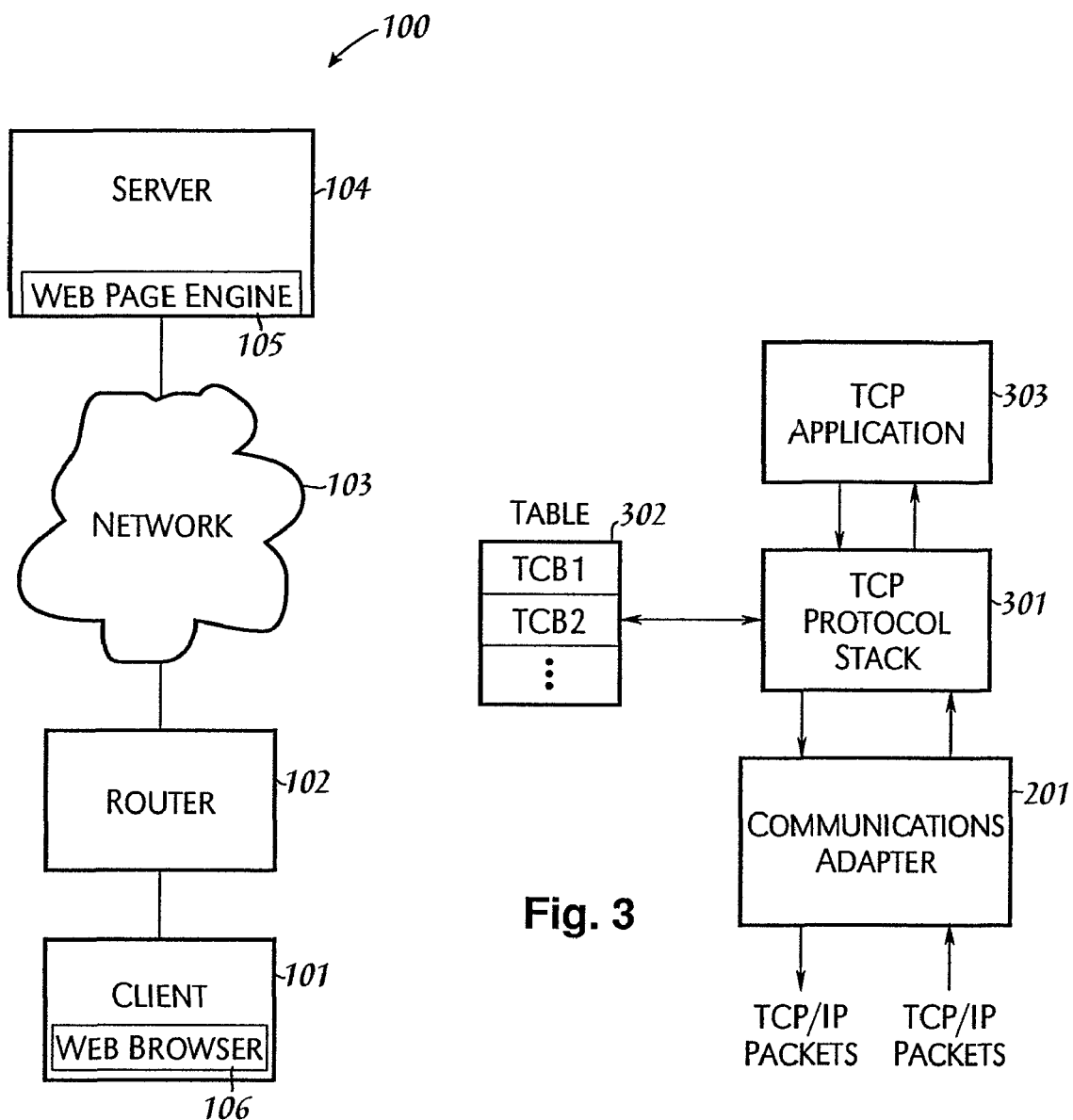
FIG. 1 illustrates a network system in accordance with an embodiment of the present invention.
FIG. 3 illustrates a block diagram of the components involved in processing TCP/IP packets with fewer memory accesses in accordance with an embodiment of the present invention.

FIG. 1—Network System

FIG. 1 illustrates an embodiment of a network system 100 in accordance with the present invention. Network system 100 may comprise a client 101 coupled to a router 102. A more detailed description of client 101 is provided below in association with FIG. 2. Network system 100 may further comprise a network 103 coupled to router 102. Router 102 may be configured to forward packets of data issued from client 101 to network 103. Network 103 may be a Local Area Network (LAN), e.g., Ethernet, Token Ring, ARCnet or a Wide Area Network (WAN), e.g., Internet. It is noted that the Internet may refer to a network of computers. In one embodiment, network 103 may be an Internet Protocol (IP) network. Network system 100 may further comprise a server 104 coupled to client 101 via network 103 and router 102. It is further noted that the connection between client 101 and server 104 may be any medium type, e.g., wireless, wired. It is further noted that client 101 may be any type of device, e.g., wireless, Personal Digital Assistant (PDA), cell phone, personal computer system, workstation, Internet appliance, configured with the capability of connecting to network 103 and consequently communicating with server 104. It is further noted that network system 100 may be any type of system that has at least one server and at least one client and that FIG. 1 is not to be limited in scope to any one particular embodiment.

Server 104 may comprise a web page engine 105 for maintaining and providing access to an Internet web page which is enabled to forward web pages to a web browser 106 of client 101. Web pages are typically formatted as a markup language file, for example HyperText Markup Language (HTML) or Extended Markup Language (XML). Web browser 106 may be configured for reading and interpreting web pages. While the illustrated client engine is a web browser 106, those skilled in the art will recognize that other client engines may be used in accordance with the principles of the present invention.

FIG. 2—Client

Figure 2:
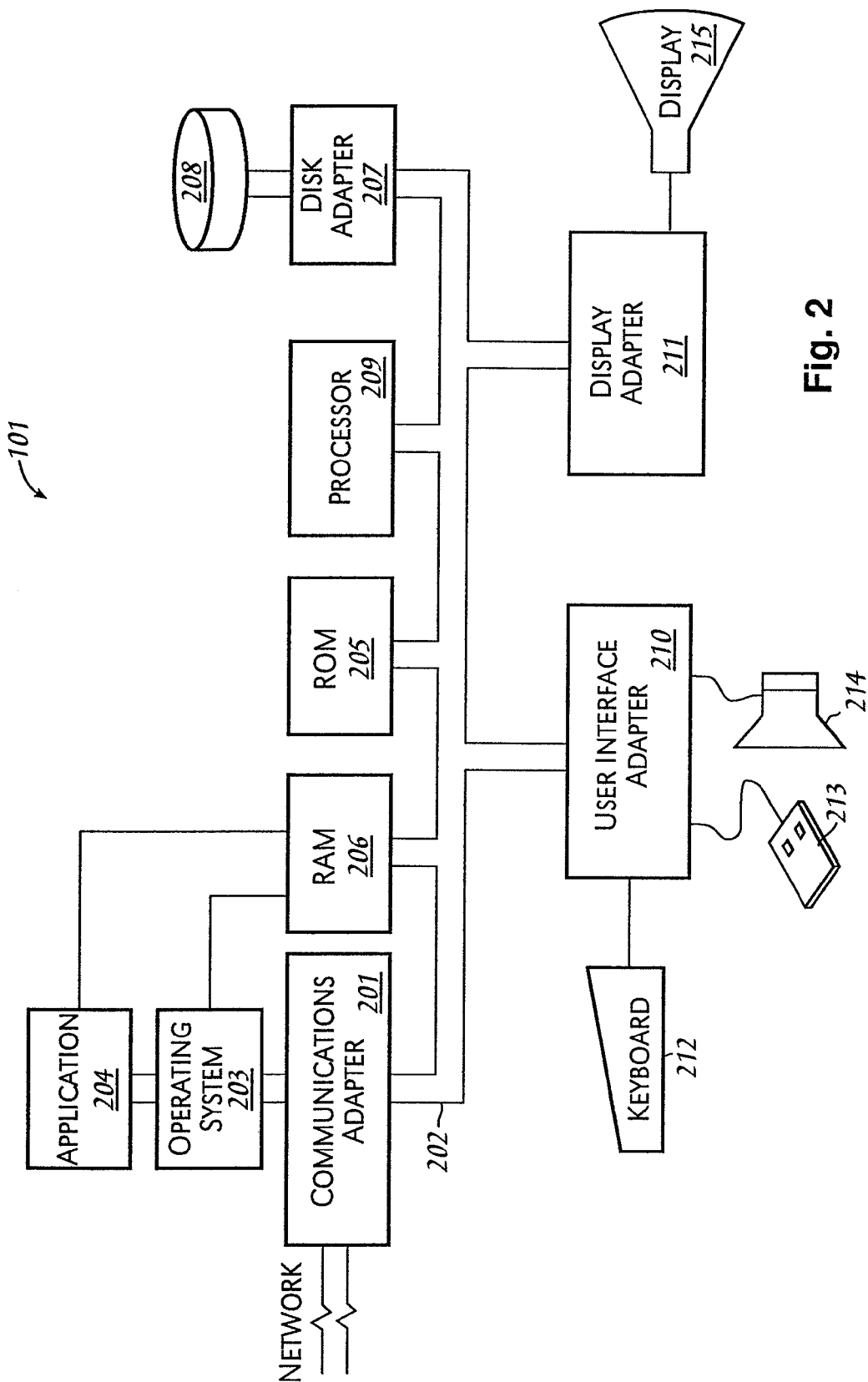
FIG. 2 illustrates an embodiment of the present invention of a client in the network system.

FIG. 2 illustrates a typical hardware configuration of client 101 (FIG. 1) which is representative of a hardware environment for practicing the present invention. Client 101 may have a communication adapter 201 coupled to a bus 202. Communications adapter 201 may enable client 101 to communicate with router 102 (FIG. 1), network 103 (FIG. 1) and server 104 (FIG. 1). Communications adapter 201 may be configured to receive and transmit TCP/IP packets of data from and to other network devices, e.g., server 104. An operating system 203 may run on communications adapter 201 and provide control and coordinate the functions of the various components of FIG. 2. Operating system 203 may include a TCP protocol stack. The TCP protocol stack may refer to the TCP/IP protocol suite used to enable a network device, such as client 101, to communicate to another network device, such as server 104, over an Internet Protocol (IP) network. A more detail description of the TCP protocol stack is provided further below in association with FIGS. 3 and 4. An application 204 in accordance with the principles of the present invention may run in conjunction with operating system 203 and provide calls to operating system 203 where the calls implement the various functions or services to be performed by application 204. Application 204 may include, for example, a web browser 106 (FIG. 1). Application 204 may further include a TCP application. The TCP application may not perform a lock, read, write or unlock operation on a transport control block (TCB) during the processing of an incoming TCP/IP data packet thereby reducing memory accesses as explained in further detail below in association with FIGS. 3 and 4.

Read-Only Memory (ROM) 205 may be coupled to system bus 202 and include a basic input/output system ("BIOS") that controls certain basic functions of client 101. Random access memory (RAM) 206 and disk adapter 207 may also be coupled to system bus 202. It should be noted that software components including operating system 203 (including the TCP protocol stack) and application 204 (including the TCP application) may be loaded into RAM 206 which may be the computer system's main memory for execution. RAM 206 may be configured to store a table of a list of transport control blocks (TCBs) as discussed in further detail below in association with FIGS. 3 and 4. Further, RAM 206 may be configured to store a fragment data list as discussed in further detail below in association with FIGS. 3 and 4. Disk adapter 207 may be an integrated drive electronics ("IDE") adapter that communicates with a disk unit 208, e.g., disk drive. It is noted that web browser 106 may reside in disk unit 208 or in application 204. It is further noted that the TCP application may reside in disk unit 208 or in application 204. It is further noted that the table of a list of TCBs and the data fragment list may be stored in ROM 205 or in disk unit 208.

Referring to FIG. 2, client 101 may further comprise a processor 209 coupled to bus 202 configured to execute instructions, e.g., process TCP/IP data packets transmitted from the TCP application.

I/O devices may also be connected to system bus 202 via a user interface adapter 210 and a display adapter 211. Keyboard 212, mouse 213 and speaker 214 may all be interconnected to bus 202 through user interface adapter 210. Event data may be inputted to client 101 through any of these devices. A display monitor 215 may be connected to system bus 202 by display adapter 211. In this manner, a user is capable of inputting, e.g., entering a session with server 104, to client 101 through keyboard 212 or mouse 213 and receiving output from client 101 via display 215 or speaker 214.

Implementations of embodiments of the present invention include implementations as a computer system programmed to execute the method or methods described herein, and as a computer program product. According to the computer system implementations, sets of instructions for executing the method or methods are resident in the random access memory 206 of one or more computer systems configured generally as described above. Until required by client 101, the set of instructions may be stored as a computer program product in another computer memory, for example, in disk drive 208 (which may include a removable memory such as an optical disk or floppy disk for eventual use in disk drive 208).

Figure 4:
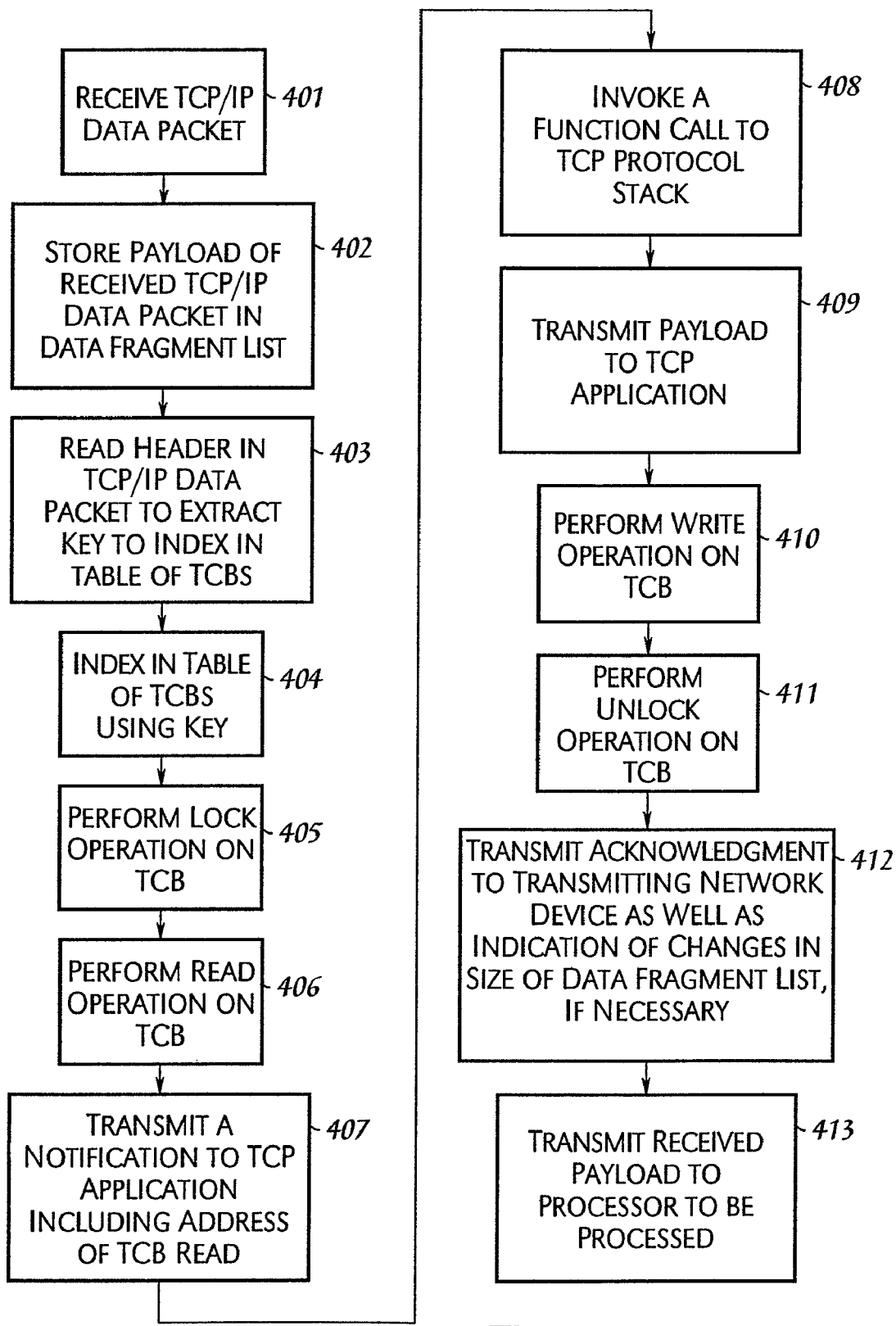
FIG. 4 is a flowchart of a method for processing TCP/IP packets with fewer memory accesses in accordance with an embodiment of the present invention.

As stated in the Background Information section, processing an incoming TCP/IP packet may require at least 8 operations or accesses (TCP protocol stack performs 4 operations and the TCP application performs 4 operations) to the memory storing the table of TCBs. If the number of memory accesses could be reduced, the latency involved in processing a TCP/IP packet would be reduced and hence the performance of the network device could be improved. Therefore, there is a need in the art to reduce memory accesses (transport control block accesses) in processing TCP/IP packets. A process for reducing memory accesses (transport control block accesses) in processing TCP/IP packets is described below in association with FIGS. 3 and 4. FIG. 3 is a block diagram of the components involved in processing TCP/IP packets with fewer memory accesses. FIG. 4 is a flowchart of a method for processing TCP/IP packets with fewer memory accesses using the components described in FIG. 3. FIGS. 3 and 4 will be discussed in conjunction with one another.

FIGS. 3 and 4—Components Involved in Processing TCP/IP Packets with Fewer Memory Accesses and Method for Processing TCP/IP Packets with Fewer Memory Accesses FIG. 3 illustrates an embodiment of the present invention of a block diagram of the components involved in processing TCP/IP packets with fewer memory accesses. FIG. 4 is a flowchart of one embodiment of the present invention of a method 400 for processing TCP/IP packets with fewer memory accesses using the components in FIG. 3.

Referring to FIG. 4, in conjunction with FIG. 3, in step 401, communications adapter 201 (FIG. 2) receives a TCP/IP packet of data from a transmitting network devices, e.g., server 104 (FIG. 1). As stated above, communications adapter 201 is configured to receive and transmit TCP/IP packets of data. In step 402, the payload of the received TCP/IP packet is extracted and stored in a buffer, referred to as a data fragment list, by a TCP protocol stack 301 residing in operating system 203 (FIG. 2). As stated above, the data fragment list may be stored in RAM 206 (FIG. 2), ROM 205 (FIG. 2) or in disk unit 208 (FIG. 2).

In step 403, TCP protocol stack 301 reads the header of the received TCP/IP packet in order to extract a key, e.g., value stored in a series of bits, used to index in a table 302 storing a list of transport control blocks (TCBs). In one embodiment, table 301 stored in RAM 206, e.g., DRAM, ROM 205 or in disk unit 208. In step 404, TCP protocol stack 301 indexes in table 302 using the key obtained in step 403 to index in table 302 to obtain the TCB that is associated with the connection to be established by the transmitting network device (network device that transmitted the TCP/IP packet).

In step 405, TCP protocol stack 301 performs a lock operation on the indexed TCB in the case of a multithreaded system to prevent multiple processes (threads) operating in parallel from accessing the same TCB. Locking may refer to preventing another process from accessing the TCB.

In step 406, TCP protocol stack 301 performs a read operation on the indexed TCB. The TCB may contain such information as the sequence number, packet type, data string type and a pointer to a location in the data fragment list. Hence, the TCP protocol stack 301 may read the indexed TCB to obtain information such as the expected sequence number.

In step 407, TCP protocol stack 301 transmits a notification to a TCP application 303 to read the data in the payload of the received TCP/IP packet. The notification may further include the address of the indexed TCB.

In step 408, TCP application 303 invokes a function call to TCP protocol stack 301 to read the payload in the received packet. The function call may include a request to read a particular number of bytes in the payload.

In step 409, TCP protocol stack 301 transmits the payload to TCP application 303. That is, TCP protocol stack 301 transmits the requested number of bytes of the payload to TCP application 303. TCP protocol stack 301 is able to transmit the payload directly to TCP application 303 instead of TCP application 303 performing the operations of lock, read, write and unlock on the TCB as TCP application 303 and TCP protocol stack 301 are operating on the same thread. TCP application 303 and TCP protocol 301 are operating on the same thread as TCP protocol stack 301 continues to have the TCB locked during the reading of the TCB by TCP protocol stack 301 and the transmission of the payload to TCP application 303. By TCP application 303 not being required to perform the lock, read, write and unlock operations on the indexed TCB, there is a reduction in the number of memory accesses thereby reducing the latency in processing TCP/IP packets.

In step 410, TCP protocol stack 301 performs a write operation on the indexed TCB. For example, TCP protocol stack 301 may update the next sequence number to be received. Further, TCP protocol stack 301 may updated the pointer that points to a particular location in the data fragment list. The pointer may need to be updated to indicate the last byte that was read by TCP application 301.

In step 411, TCP protocol stack 301 unlocks the indexed TCB thereby allowing another process to access the indexed TCB.

In step 412, TCP protocol stack 301 transmits an acknowledgment to the transmitting network device, e.g., server 104, that it received its packet of data. In addition, TCP protocol stack 301 may transmit an indication of any changes in size to the data fragment list after TCP application 303 reads data for the list. For example, TCP protocol stack 301 may inform the transmitting network device that the data fragment list is no longer full and that TCP protocol stack 301 is able to receive new packets of data from the transmitting network device. Hence, the notification of any changes in size to the data fragment list may be transmitted along with the acknowledgment instead of separately as described in the Background Information section.

In step 413, TCP application 303 transmits the payload read to processor 209 (FIG. 2) to be processed.

It is noted that the steps described above in method 400 describe a TCP receive function where client 101 (FIG. 2) receives a TCP/IP data packet from a transmitting network device. It is further noted that steps similar to the steps in method 400 may be performed by a TCP transmit function where a message needs to be sent by TCP application 303. It is further noted that a person of ordinary skill in the art would be capable of modifying method 400 to perform a TCP transmit function incorporating the principles of the present invention of reducing the number of memory accesses. Further, it is noted that embodiments incorporating such principles of the present invention to perform a TCP transmit function would fall within the scope of the present invention.

It is further noted that method 400 may include other and/or additional steps that, for clarity, are not depicted. It is further noted that method 400 may be executed in a different order than presented and that the order presented in the discussion of FIG. 4 is illustrative. It is further noted that certain steps in method 400 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A computer program product stored in computer program memory for processing packets of data, comprising instructions that executed by a computer to perform the steps of:

receiving a packet of data;
storing a payload of said packet of data in a buffer;
reading a header of said packet of data to extract a value;
indexing in a table storing a list of transport control blocks using said value;
performing a lock operation on a transport control block in an indexed entry in said table;

performing a read operation on said transport control block;

transmitting a notification to an application to read said payload, wherein said notification comprises an address of said transport control block; and transmitting said payload of said received packet of data to said application whereby said application does not perform a lock, read, write or unlock operation on said transport control block.

2. The computer program product as recited in claim 1 further comprising step of:

receiving an invocation of a function call from said application upon said application receiving said notification to read said payload.

3. The computer program product as recited in claim 1 further comprising steps of:

performing a operation on said transport control block;

performing an unlock operation on said transport control block; and transmitting an acknowledgment to a transmitting network device.

4. The computer program product as recited in claim 3 further comprising step of:

transmitting an indication of a change in a size of said buffer to said transmitting network device.

5. The computer program product as recited in claim 1 further comprising step of:

transmitting said received payload to a processor to be processed.

6. A system, comprising:

a communications adapter configured to communicate with an outside network, wherein said communications adapter receives a packet of data from said outside network;

a memory unit coupled to said communications adapter, wherein said memory unit stores a table listing a plurality of transport control blocks;

a TCP protocol stack running on said communications adapter;

a TCP application running on said communications adapter;

wherein said TCP protocol stack is configured to perform the following programming steps:

storing a payload of said packet of data in a buffer in said memory unit;

reading a header of said packet of data to extract a value;

indexing in said table using said value;

performing a lock operation on a transport control block in an indexed entry in said table;

performing a read operation on said transport control block;

transmitting a notification to said TCP application to read said payload, wherein said notification comprises an address of said transport control block; and transmitting said payload of said received packet of data to said TCP application whereby said TCP application does not perform a lock, read, write or unlock operation on said transport control block.

7. The system as recited in claim 6, wherein said TCP protocol stack is further configured to perform the following programming step receiving an invocation of a function call from said TCP application upon said TCP application receiving said notification to read said payload.

8. The system as recited in claim 6, wherein said TCP protocol stack is further configured to perform the following programming steps:

performing a write operation on said transport control block;

performing an unlock operation on said transport control block; and transmitting an acknowledgment to a transmitting network device.

9. The system as recited in claim 8, wherein said TCP protocol stack is further configured to perform the following programming step:

transmitting an indication of a change in a size of said buffer to said transmitting network device.

10. The system as recited in claim 6 further comprising:

a processor coupled to communications adapter;

wherein said TCP application is configured to perform the following programming step:

transmitting said received payload to said processor to be processed.

* * * * *